No. 727,684. PATENTED MAY 12, 1903.
W. B. POTTER.
ELECTRIC MOTOR SYSTEM.
APPLICATION FILED OCT. 31, 1900.

NO MODEL.

Witnesses:
Lewis P. Abell
Benjamin B. Hull

Inventor.
William B. Potter.
by Albert E. Davis
Atty.

No. 727,684.                                                                 Patented May 12, 1903.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

ELECTRIC-MOTOR SYSTEM.

SPECIFICATION forming part of Letters Patent No. 727,684, dated May 12, 1903.

Application filed October 31, 1900. Serial No. 34,997. (No model.)

*To all whom it may concern:*

Be it known that I, WILLIAM B. POTTER, a citizen of the United States, residing at Schenectady, county of Schenectady, State of New York, have invented certain new and useful Improvements in Electric-Motor Systems, of which the following is a specification.

My invention relates to motor systems, and has for one of its objects to provide for using a storage battery in place of the resistances customarily employed in connection with a motor-controller.

Furthermore, my invention enables a motor to be started by means of the battery-current only and afterward brought up to and maintained at full speed by means of current taken from a main source of supply and opposed to the electromotive force of the battery, the direction of the current through the motor being the same under both conditions. Moreover, the arrangement is such that as soon as the current from the main source is cut in it not only serves to drive the motor, but also to recharge the battery.

Figure 1:
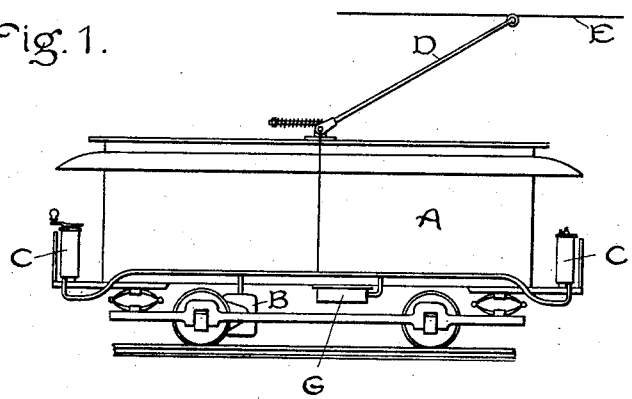
Figure 2:
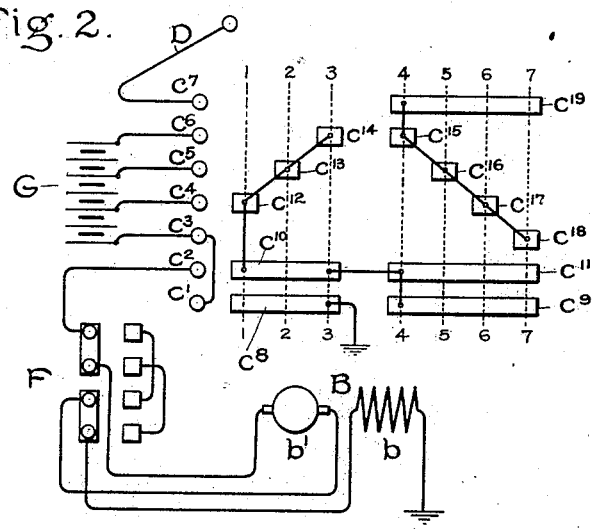
Figure 3:
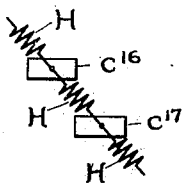

In the accompanying drawings, Figure 1 is a side elevation of an electric-railway car provided with an overhead trolley and equipped with my improved device for controlling the motor. Fig. 2 is a diagram of the controller connections, and Fig. 3 shows a modification of the same.

The car A is shown as provided with a single motor B, connected with controllers C at each end of the car and taking current through a trolley D from an overhead line conductor E, connected to a suitable source of supply.

In Fig. 2 the field-magnet of the motor is shown at $b$ and the armature at $b'$. A reversing-switch F, of the usual construction, is in circuit with the motor and in connection with a stationary contact-finger $c^2$ in the controller. The fingers $c^3$ $c^4$ $c^5$ $c^6$ are the terminals of sections of a storage battery G. Finger $c'$ is connected with finger $c^3$ and finger $c^7$ is in circuit with the trolley D.

The controller-cylinder carries a grounded contact-plate $c^8$, coacting with finger $c'$ during the first three positions of the controller, and a contact-plate $c^9$, coacting with said finger during the last four positions of the controller. Parallel with these plates are two contact-plates $c^{10}$ $c^{11}$, connected together and with the plate $c^9$. In the first position of the controller a contact-segment $c^{12}$ coacts with the finger $c^4$. In the second position contact-segment $c^{13}$ coacts with finger $c^5$, and in the third position contact-segment $c^{14}$ with finger $c^6$, the segments $c^{12}$, $c^{13}$, and $c^{14}$ being electrically connected with each other and with the plate $c^{10}$.

In the fourth position of the controller contact-segment $c^{15}$ coacts with finger $c^6$, in the fifth position contact-segment $c^{16}$ with finger $c^5$, in the sixth position contact-segment $c^{17}$ with finger $c^4$, and in the seventh position contact-segment $c^{18}$ with finger $c^3$. A plate $c^{19}$ makes contact with finger $c^7$ during the last four positions, said plate being connected with all the segments $c^{15}$, $c^{16}$, $c^{17}$, and $c^{18}$. It follows from this construction that in the first position one section of the battery is in circuit with the motor, in the second position two sections, and in the third position the entire battery is discharging through the motor. In the fourth position, however, the trolley-current, entering at the finger $c^7$, flows through the battery in the opposite direction to the path of discharge of said battery, passing out by way of the plates $c^9$ and strip $c^{11}$ and flowing through the motor in the same direction as the current previously supplied by the battery. In this position the entire electromotive force of the battery is opposed to the trolley-current, so that a large percentage of the energy is consumed in recharging the battery; but as the several portions of the battery are successively cut out by moving the controller-handle to positions 5, 6, and 7 more and more of the trolley-current is utilized in the motor until in the last position 7 the battery is entirely out of circuit and the motor is running with the full current from the trolley.

The potential of the storage battery should be such that the movement of the controller from position 3 to position 4 will increase the potential at the motor-terminals by the same amount as the movement from position 2 to position 3, thereby securing a uniform acceleration of the motor. Evidently the controller may have any desired number of operative positions and the battery any desired number of sections.

In Fig. 2 the segments are so arranged as to open-circuit the battery between them; but they may be arranged to overlap, as shown in Fig. 3, resistances H being introduced between the different segments to prevent short-circuiting of the battery-cells affected by the transition.

Although I have hereinbefore described my invention as applied to a single motor, yet it is equally applicable to a plurality of motors or to series-parallel control.

What I claim as new, and desire to secure by Letters Patent of the United States, is—

1. The combination with an electric motor, of a main source of supply therefor, a storage battery, and a controller constructed and arranged to start the motor from the storage battery alone, then to throw the motor in circuit with the main source in series with the storage battery, and finally to cut the storage battery out of circuit.

2. The combination with an electric motor, of a main source of supply therefor, a storage battery, and a controller constructed and arranged to connect the motor across a portion of the cells of the storage battery to start the same, then to gradually cut the succeeding sections of the battery into the circuit, then to connect the motor in circuit with the main source in series with the storage battery reversely connected, and finally to cut out the sections of the storage battery in the reverse order in which they were cut in.

3. The combination with an electric motor, of a source of current of substantially constant potential, a storage battery, and a controller constructed and arranged to first connect the motor across a portion of the cells of the storage battery to start the motor, then to gradually increase the number of cells in the circuit until a predetermined potential at the motor-terminals is reached, then to connect the motor in circuit with the constant potential source in series with the storage battery reversely connected, and finally to cut the said battery out of circuit.

In witness whereof I have hereunto set my hand this 29th day of October, 1900.

WILLIAM B. POTTER.

Witnesses:
BENJAMIN B. HULL,
MARGARET E. WOOLLEY.